US012226829B2

(12) United States Patent
Haynes, III et al.

(10) Patent No.: US 12,226,829 B2
(45) **Date of Patent: *Feb. 18, 2025**

(54) ATOMIZED PICOSCALE COMPOSITION ALUMINUM ALLOY AND METHOD THEREOF

(71) Applicant: TECNIUM, LLC, Margate City, NJ (US)

(72) Inventors: Thomas G. Haynes, III, Tampa, FL (US); Martin Walcher, Oberndorf (AT); Martin Balog, Bratislava (SK)

(73) Assignee: TECNIUM, LLC

( * ) Notice: Subject to any disclaimer, the term of this patent is extended or adjusted under 35 U.S.C. 154(b) by 0 days.

This patent is subject to a terminal disclaimer.

(21) Appl. No.: 18/133,738

(22) Filed: Apr. 12, 2023

(65) Prior Publication Data

US 2023/0241677 A1 Aug. 3, 2023

Related U.S. Application Data

(63) Continuation of application No. 16/884,600, filed on May 27, 2020, now abandoned, which is a (Continued)

(51) Int. Cl.

*B22F 3/20* (2006.01)
*B22F 1/12* (2022.01)

(Continued)

(52) U.S. Cl.

CPC .................. *B22F 3/20* (2013.01); *B22F 1/12* (2022.01); *B22F 3/10* (2013.01); *B22F 3/12* (2013.01);

(Continued)

(58) Field of Classification Search

CPC ...... B22F 3/20; B22F 1/12; B22F 3/10; B22F 3/12; B22F 5/00; B22F 7/008; B22F 9/04;

(Continued)

(56) References Cited

U.S. PATENT DOCUMENTS 2,796,660 A 9/1957 Irmann
3,004,331 A 10/1961 Raymond et al.

(Continued)

FOREIGN PATENT DOCUMENTS

EP 1172449 1/2002
EP 2081713 8/2021

(Continued)

OTHER PUBLICATIONS

Hansen Niels., Dispersion-strengthened of aluminium powder products for nuclear application, vol. 10, Nr.:20, Publication date: Jan. 1, 1967, pp. 94-115.

(Continued)

*Primary Examiner* — Ricardo D Morales
(74) *Attorney, Agent, or Firm* — The Belles Group, P.C.

(57) ABSTRACT

The invention is a process for manufacturing a nano aluminum/alumina metal matrix composite and composition produced therefrom. The process is characterized by providing an aluminum powder having a natural oxide formation layer and an aluminum oxide content between about 0.1 and about 4.5 wt. % and a specific surface area of from about 0.3 and about 5 $m^2/g$, hot working the aluminum powder, and forming a superfine grained matrix aluminum alloy. Simultaneously there is formed in situ a substantially uniform distribution of nano particles of alumina. The alloy has a substantially linear property/temperature profile, such that physical properties such as strength are substantially maintained even at temperatures of 250° C. and above.

6 Claims, 9 Drawing Sheets

Related U.S. Application Data continuation of application No. 16/273,522, filed on Feb. 12, 2019, now Pat. No. 10,676,805, which is a continuation of application No. 15/413,818, filed on Jan. 24, 2017, now Pat. No. 10,202,674, which is a continuation of application No. 14/630,141, filed on Feb. 24, 2015, now Pat. No. 9,551,048, which is a continuation of application No. 13/705,012, filed on Dec. 4, 2012, now Pat. No. 8,961,647, which is a continuation of application No. 12/312,089, filed as application No. PCT/US2007/071233 on Jun. 14, 2007, now Pat. No. 8,323,373.

(60) Provisional application No. 60/854,725, filed on Oct. 27, 2006.

(51) Int. Cl.

| | |
|---|---|
| ***B22F 3/10*** | (2006.01) |
| ***B22F 3/12*** | (2006.01) |
| ***B22F 5/00*** | (2006.01) |
| ***B22F 7/00*** | (2006.01) |
| ***B22F 9/04*** | (2006.01) |
| ***C22C 1/04*** | (2023.01) |
| ***C22C 1/051*** | (2023.01) |
| ***C22C 21/00*** | (2006.01) |
| ***C22C 32/00*** | (2006.01) |
| ***G21F 1/08*** | (2006.01) |

(52) U.S. Cl.

CPC ................ *B22F 5/00* (2013.01); *B22F 7/008* (2013.01); *B22F 9/04* (2013.01); *C22C 1/0416* (2013.01); *C22C 1/051* (2013.01); *C22C 21/00* (2013.01); *C22C 32/00* (2013.01); *C22C 32/0036* (2013.01); *C22C 32/0057* (2013.01); *G21F 1/08* (2013.01); *B22F 2003/208* (2013.01); *B22F 2009/041* (2013.01); *B22F 2301/052* (2013.01); *B22F 2302/10* (2013.01); *B22F 2998/10* (2013.01)

(58) Field of Classification Search

CPC .......... B22F 2003/208; B22F 2009/041; B22F 2301/052; B22F 2302/10; B22F 2998/10; C22C 1/0416; C22C 1/051; C22C 21/00; C22C 32/00; C22C 32/0036; C22C 32/0057; C22C 1/05; G21F 1/08; B82B 3/00; B82Y 40/00

See application file for complete search history.

(56) References Cited

U.S. PATENT DOCUMENTS

| | | | | |
|---|---|---|---|---|
| 2,963,780 | A | 12/1961 | Lyle, Jr. et al. | |
| 3,069,759 | A * | 12/1962 | Grant | C22C 32/00 419/21 |
| 3,670,400 | A | 6/1972 | Singer et al. | |
| 3,740,210 | A | 6/1973 | Bomford | |
| 4,200,767 | A | 4/1980 | Koyama et al. | |
| 4,818,308 | A | 4/1989 | Odani et al. | |
| 5,053,085 | A | 10/1991 | Masumoto et al. | |
| 5,547,632 | A | 8/1996 | Horimura et al. | |
| 5,561,829 | A | 10/1996 | Sawtell et al. | |
| 5,656,217 | A | 8/1997 | Rogers et al. | |
| 5,688,303 | A | 11/1997 | Benjamin | |
| 5,965,829 | A * | 10/1999 | Haynes | G21F 1/08 75/238 |
| 6,024,806 | A | 2/2000 | Yoshino | |
| 6,042,779 | A | 3/2000 | Oschmann et al. | |
| 6,287,714 | B1 | 9/2001 | Xiao et al. | |
| 6,332,906 | B1 | 12/2001 | Haynes et al. | |
| 6,398,843 | B1 | 6/2002 | Tarrant | |
| 6,402,860 | B2 | 6/2002 | Hashikura et al. | |
| 6,602,314 | B1 | 8/2003 | Sakaguchi et al. | |
| 6,630,008 | B1 | 10/2003 | Meeks, III et al. | |
| 6,726,741 | B2 | 4/2004 | Murakami et al. | |
| 6,852,275 | B2 | 2/2005 | Kida | |
| 7,097,807 | B1 | 8/2006 | Meeks, III et al. | |
| 7,177,384 | B2 | 2/2007 | Kazuo et al. | |
| 7,288,133 | B1 | 10/2007 | Peng et al. | |
| 7,297,310 | B1 | 11/2007 | Peng et al. | |
| 8,961,647 | B2 * | 2/2015 | Haynes, III | B22F 3/12 419/48 |
| 9,551,048 | B2 | 1/2017 | Haynes, III et al. | |
| 2003/0170137 | A1 | 9/2003 | Yeo et al. | |

FOREIGN PATENT DOCUMENTS

| | | |
|---|---|---|
| JP | 5142985 | 4/1976 |
| JP | 1448125 | 9/1976 |
| JP | 60093746 | 5/1985 |
| JP | 0192328 | 4/1989 |
| JP | 11279723 | 10/1999 |
| JP | 200142089 | 2/2001 |
| JP | 2001083287 | 3/2001 |
| WO | WO2008063708 | 5/2008 |

OTHER PUBLICATIONS

BET theory, WIKIPEDIA, Feb. 10, 2022, https://en.wikipedia.org/w/index.php?title=BET_theory&oldid=1070926730, Publication date: Feb. 10, 2022, pp. 1-6.

Lyle, J.P., Properties of Powders and Powder Metallurgy Products, Aluminium, vol. I Properties, Physical Metallurgy and Phase Daigrams, Jan. 1, 1967, American Societe for Metals, vol. I (Part: Chapter 10), pp. 337-358.

Balog Martin et al., Ultra-Fine Grained PM AL Profiles, Deformation and fracture in structural PM materials DF PM 2005, ISSN: 80-968543-4-8, Publication date: Sep. 27, 2005, pp. 1-4.

Balog Martin et al., Compaction of ultra-fine AI powders, Int. Journal Materials and Product Technology, Jan. 1, 2005, vol. 23, Nr.: 1/2, pp. 69-78.

Balog Martin, Ultra-fine grained AI profiles with high temperature stability, Dissertation Thesis, Jan. 1, 2006, pp. 1-56.

Balog Martin, Ultra-fine grained AI profiles with high temperature stability, Dissertation Thesis, Jan. 1, 2006, pp. 57-113.

Hansen, N., Dispersion strengthening of aluminium-aluminium-oxide products, Acta Metallurgica., Jan. 1, 1970, Pergamon Press., US, https://dx.doi.org/10.1016/0001-6160(70)90077-5, vol. 18, Nr.: 1, pp. 137-145.

Wikipedia, Specific surface area, Retrieved from: https://en.wikipedia.org/w/index.php?title=Specific_surface_area&oldid=1076718466, pp. 1-3.

Konynenburg et al., "Scoping Corrosion Tests on Candidate Waste Package Basket Materials for the Yucca . . . ", US Department of Energy/Lawrence Livermore National Lab, Mar. 1998.

* cited by examiner

| SAMPLE NO. | PSD [μm] d10 | PSD [μm] d50 | PSD [μm] d90 | SPEC. SURFACE AREA BET[$m^2/g$] | UTS [MPa] RT | UTS [MPa] 300°C |
|---|---|---|---|---|---|---|
| #1 | 0.7 | 1.3 | 2.2 | 4.54 | 310 | 180 |
| #2 | 0.4 | 1.6 | 3.3 | 1.68 | 240 | 145 |
| #3 | 1.9 | 4.51 | 11.76 | 0.94 | 220 | 138 |
| #4 | 5.38 | 10.18 | 20.39 | 0.59 | 160 | 112 |

MEASURING CONDITION: TB2
FOCAL LENGTH: R2 0.25/0.45 87.5μm
START: c.opt>=1.00%
STOP: 5.00s c.opt<-1.00% odcr 50.00s ??????
TIME BASIS: 100.00ms DISPERSING METHOD: rodm
PRESSURE: 3.00 bar
DOSING SYSTEM: VIBRI
VACUUM: max
FLOW BED HEIGHT: 1.50mm
FEED RATE: 40.00%

ANALYSIS: WINDOX 4.2.2.0, HRLD
$C_{opt}$=29.78%
DENSITY: 1.00g/cm
REFERENCE POINT MEASUREMENT: 17.07 12:59:38
FORM FACTOR: 1.00

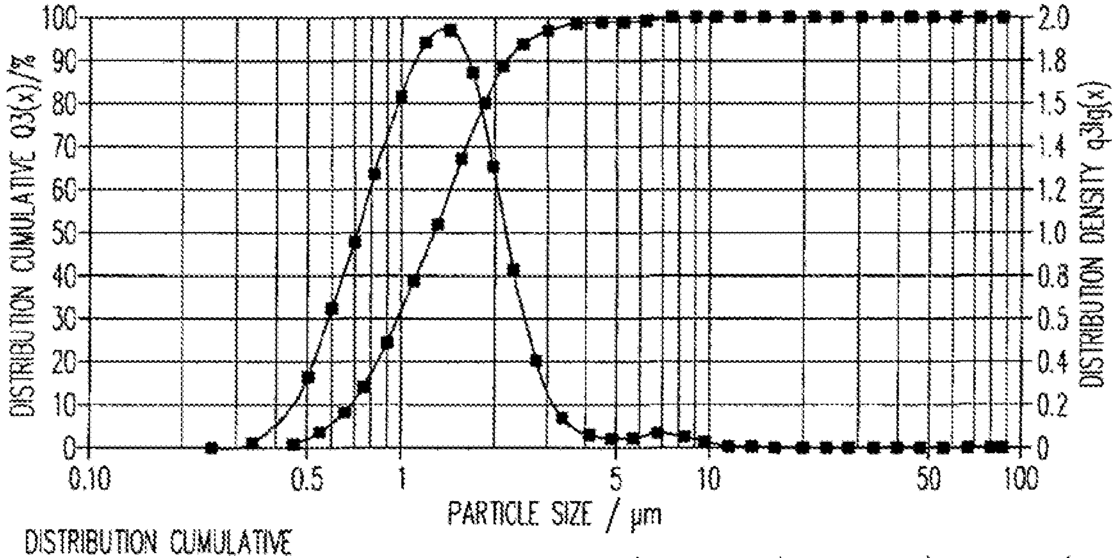

DISTRIBUTION CUMULATIVE

| $x_0$/μm | $Q_3$/% | $x_0$/μm | $Q_3$/% | $x_0$/μm | $Q_3$/% | $x_0$/μm | $Q_3$/% |
|---|---|---|---|---|---|---|---|
| 0.45 | 0.53 | 1.85 | 79.75 | 7.50 | 99.52 | 30.50 | 100.00 |
| 0.55 | 3.38 | 2.15 | 88.20 | 9.00 | 99.87 | 36.50 | 100.00 |
| 0.65 | 8.05 | 2.50 | 93.57 | 10.50 | 100.00 | 43.50 | 100.00 |
| 0.75 | 13.96 | 3.00 | 96.77 | 12.50 | 100.00 | 51.50 | 100.00 |
| 0.90 | 23.98 | 3.75 | 98.10 | 15.00 | 100.00 | 61.50 | 100.00 |
| 1.10 | 38.10 | 4.50 | 98.52 | 18.00 | 100.00 | 73.50 | 100.00 |
| 1.30 | 51.71 | 5.25 | 98.75 | 21.50 | 100.00 | 87.50 | 100.00 |
| 1.55 | 66.44 | 6.25 | 99.05 | 25.50 | 100.00 | | |

$x_{10}$ = 0.68μm $x_{50}$ = 1.27μm $x_{90}$ = 2.27μm SMD = 1.14μm VMD = 1.46μm

Q(5) = 98.68% Q(10) = 99.96% Q(15) = 100.00% $S_v$ = 5.26$m^2/cm^3$ $S_m$ = 52577.6 $cm^3/g$

FIG. 7

ATOMIZED PICOSCALE COMPOSITION ALUMINUM ALLOY AND METHOD THEREOF

CROSS REFERENCE TO RELATED APPLICATIONS

The present application is a continuation of U.S. patent application Ser. No. 16/884,600, filed on May 27, 2020, which is a continuation of U.S. patent application Ser. No. 16/273,522, filed on Feb. 12, 2019, which is a continuation of U.S. patent application Ser. No. 15/413,818, filed on Jan. 24, 2017, now issued as U.S. Pat. No. 10,202,674, which is a continuation of U.S. patent application Ser. No. 14/630,141, filed on Feb. 24, 2015, now issued as U.S. Pat. No. 9,551,048, which is a continuation of U.S. patent application Ser. No. 13/705,012, filed on Dec. 4, 2012, now issued as U.S. Pat. No. 8,961,647, which is a continuation of U.S. patent application Ser. No. 12/312,089, filed on Sep. 16, 2009, now issued as U.S. Pat. No. 8,323,373, which in turn is a U.S. national stage application under 35 U.S.C. § 371 of PCT Application No. PCT/US2007/071233, filed Jun. 14, 2007, which claims priority to U.S. Provisional Patent Application No. 60/854,725, filed Oct. 27, 2006, the entireties of which are incorporated herein by reference.

FIELD OF THE INVENTION

The present invention relates generally to the art of aluminum alloys. More specifically, the invention is directed to the use of powder metallurgy technology to form aluminum composite alloys which maintain their high performance characteristics even at elevated temperatures. The invention accomplishes this through the use of nanotechnology applied to particulate materials incorporated within the aluminum alloy. The resulting alloy composite has high temperature stability and a unique linear property/temperature profile. The alloy's high temperature mechanical properties are achieved by a uniform distribution of nano-sized alumina particulate in a superfine grained, nano-scaled aluminum matrix which is formed via the use of superfine atomized aluminum powder or aluminum alloy powder as raw material for the production route. The matrix can be pure aluminum or one or more of numerous aluminum alloys disclosed hereinbelow.

BACKGROUND OF THE INVENTION

Conventional aluminum materials exhibit many desirable properties at ambient temperatures such as light weight and corrosion resistance. Moreover, they can be tailor-made for various applications with relative ease. Thus aluminum alloys have dominated the aircraft, missile, marine, transportation, packaging, and other industries.

Despite the well known advantages of conventional aluminum alloys, their physical properties can be degraded at high temperatures, for example above 250° C. Loss of strength is particularly noticeable, and this loss of strength is a major reason why aluminum alloys are generally absent in demanding high temperature applications. In place of aluminum, the art has been forced to rely on much more expensive alloys such as those containing titanium or tungsten as the main alloying metal.

Various attempts have been made to overcome the deficiencies of aluminum alloys at high temperatures. For example, U.S. Pat. No. 5,053,085 relates to "High strength, heat resistant aluminum based alloys" having at least one element from an M group consisting of V, Cr, Mn, Fe, Co, Ni, Cu, Zr, Ti, Mo, W, Ca, Li, Mg and Si and one element from X group consisting of Y, La Ce, Sm, Nd, Hf, Ta, and Mm (Misch metal) blended to various atomic percentage ratios. These various alloy combinations produce an amorphous, microcrystalline phase, or microcrystalline composite dispersions through rapid solidification of molten aluminum. Rapid solidification of the aluminum is accomplished through melt spinning techniques which produce ribbon or wire feed stock. The ribbon or wire feed stock can be crushed and consolidated into billets for fabrication into various products through conventional extrusion, forging, or rolling technologies.

Mechanical alloying is another attempt to produce high strength aluminum alloys. Nano particle strengthening of metal matrix materials is achieved in high-energy ball mills by reducing the particulates to fine dispersoids which strengthen the base alloy. A major problem associated with this technology is the uneven working of the particulates. A given volume of material is grossly over or under processed which leads to flaws in the final structure. U.S. Pat. No. 5,688,303 relates to a mechanical alloying process which incorporates the use of rolling mill technology to allegedly improve the homogenization of the mechanical alloying.

Some of the largest obstacles to mechanical alloying technology include lack of ductility and powder handling issues. Handling of the mechanically alloyed powders is dangerous since the protective oxide is removed from the aluminum powder which then becomes pyrophoric. Aluminum powder without the protective oxide will ignite instantaneously when exposed to atmosphere so extreme caution is required during the handling of the powder blend. Moreover, the use of high energy ball mills is very expensive and time consuming which results in higher material processing costs.

Other attempts to improve high temperature physical properties include the incorporation of additives. U.S. Pat. No. 6,287,714 relates to "Grain growth inhibitor for nanostructured materials". Boron nitride (BN) is added as a grain growth inhibitor for nanostructure materials. This BN addition is added as an inorganic polymer at about 1% by weight and is uniformly dispersed at the grain boundaries which are decomposed during the heat treat temperature of the nanostructure material.

U.S. Pat. No. 6,398,843 relates to "Dispersion-strengthened aluminum alloy" for dispersion strengthened ceramic particle aluminum or aluminum alloys. This patent is based on blending ceramic particles (alumina, silicon carbide, titanium oxide, aluminum carbide, zirconium oxide, silicon nitride, or silicon dioxide) with a particle size <100 nm.

U.S. Pat. No. 6,630,008 relates to "Nanocrystalline metal matrix composites, and production methods" which involves using a chemical vapor deposition (CVD) process to fluidize aluminum powder which is coated with aluminum oxide, silicon carbide, or boron carbide then hot consolidated in the solid-state condition using heated sand as a pressure transmitting media.

U.S. Pat. No. 6,726,741 relates to aluminum composite material and manufacture based on an aluminum powder and a neutron absorber material, and a third particle. Mechanical alloying is used in the manufacturing process.

U.S. Pat. No. 6,852,275 relates to a process for production of inter-metallic compound-based composite materials. The technology is based on producing a metal powder preform and pressure infiltrating aluminum which results in a spontaneous combustion reaction to form inter-metallic compounds.

Rapid solidification processing (RSP) technology is another method employed to produce fine metallic powders. However, RSP has high costs associated with atomization of the high soluble alloying elements, powder production rates, chemistry control, and recovery steps needed in order to maintain the amorphous and nano size microstructures. The other major obstacle with RSP is the difficulty in fabrication of the materials.

These processes, while promising, have heretofore failed to address the long felt needs of manufacturing high temperature aluminum alloys on a commercial scale. Thus traditional, non-aluminum based alloys continue to dominate the high temperature alloy markets.

SUMMARY OF THE INVENTION

The present invention overcomes the deficiencies of the prior art by taking advantage of the oxide coating which naturally forms during the atomization process to manufacture aluminum powder and by taking advantage of processing of powders with a particle size distribution below 30 μm. It is known that oxides exist on atomized aluminum powder regardless of the type of atomization gas used to manufacture. See, "Metals Handbook Ninth Edition Volume 7—Powder Metallurgy" by Alcoa Labs (FIG. 1). An indication of the oxide content can be estimated by measuring the oxygen content of the aluminum powder. Generally the oxygen content does not significantly change whether air, nitrogen, or argon gases are used to manufacture the powder. As aluminum powder surface area increases (aluminum powder size decreases) the oxygen content increases dramatically, indicating a greater oxide content.

The average thickness of the oxide coating on the aluminum powders is an average of about 5 nm regardless of the type of atomization gas but is independent of alloy composition and particle size. The oxide is primarily alumina ($Al_2O_3$) with other unstable compounds such as Al (OH) and AlOOH. This alumina oxide content is primarily controlled by the specific surface area of the powder. Particle size and particle morphology are the two main parameters which influence the specific surface area of the powder (>the surface area) respectively the more irregular (>the surface area) the higher the oxide content.

With conventional aluminum powder sizes having a Particle Size Distribution (PSD) of <400 μm the particle shape/morphology becomes a very important factor towards controlling the oxide content since the irregular particle shape results in a greater surface area thus a higher oxide content. With a particle size <30 μm the effect of particle morphology has less influence on oxide content since the particles are more spherical or even ideal spherical in nature.

Generally, the oxide content for various atomized aluminum particle sizes varies between about 0.01% up to about 4.5% of alumina oxide. The present invention targets starting aluminum or aluminum alloy powders with particles of <30 μm in size which will provide between 0.1-4.5 w/o alumina oxide content.

The invention provides for hot working the desired PSD aluminum or aluminum alloy powder which produces in situ transversal nano-scaled grain size in the range of about 200 nm (a grain size reduction of factor 10.times.). Secondly the hot work operation produces in situ evenly distributed nanoscaled alumina oxide particles (the former oxide skins of the particles) with a thickness of max. 3-7 nm, resulting in high superior strength/high temperature material compared to conventional aluminum ingot metallurgy material. The superior mechanical properties are a result of the tremendous reduction in grain size and the uniform distribution of the nano-scale alumina oxide in the ultra fine grained aluminum matrix.

It is accordingly an aspect of the invention to use this 0.1-4.5 w/o nano particle alumina reinforced aluminum composite material as a structural material for higher strength and higher temperature in a variety of market applications. This nano size aluminum/alumina composite structure shall be produced without the use of mechanical alloying but only by the use of a aluminum or aluminum alloy powder with a particle size distribution <30 μm m resulting in a nano-scaled microstructure after hot working.

It is another aspect of this invention to obtain additional strength by the addition of a ceramic particulate material to the nano aluminum composite matrix material to obtain even greater strength, higher modulus of elasticity (stiffness), lower coefficient of thermal expansion (CTE), improved wear resistance, and other important physical properties. This ceramic particulate addition may include inter alia ceramic compounds such as alumina, silicon carbide, boron carbide, titanium oxide, titanium dioxide, titanium boride, titanium diboride, silicon, silicon oxide, silicon dioxide, and other industrial refractory compositions.

It is another aspect of the invention to add boron carbide particulate to this nano aluminum composite matrix for neutron absorption for the storage of spent nuclear fuel as set forth in U.S. Pat. No. 5,965,829 entitled "Radiation Absorbing Refractory Composition" issued Oct. 12, 1999 (the '829 patent) which is hereby incorporated by reference in its entirety.

It is another aspect of the invention to include other aluminum alloys such as high solubility elemental compositions in order to have a dual strengthened material through precipitation of fine intermetallic compounds through rapid solidification (in situ) of super saturated alloying element melt along with the nano-scale alumina particles uniformly dispersed throughout the microstructure after the hot work operation to produce the final product.

It is another aspect of this invention to have technology based on a bimodal particle size distribution which will exhibit uniform micro structural control without the use of mechanical alloying technology. Control of microstructure size and homogeneity dictates the high performance of the composite material.

It is another aspect of the invention to tailor the mechanical and physical properties for various market applications by changing the alloy composition of the nano aluminum/alumina composite matrix, the type of ceramic particulate addition, and the amount of ceramic particulate addition to the nano aluminum/alumina metal matrix composite material.

These aspects and others set forth below, are achieved by a process for manufacturing a nano aluminum/alumina metal matrix composite characterized by the steps of providing an aluminum powder having a natural oxide formation layer and an aluminum oxide content between about 0.1 and about 4.5 wt. % and a specific surface area of from about 0.3 and about 5.0 m.sup.2/g, hot working the aluminum powder, and forming thereby a superfine grained matrix aluminum alloy, and simultaneously forming in situ a substantially uniform distribution of nano particles of alumina throughout said alloy by redistributing said aluminum oxide, wherein said alloy has a substantially linear property/temperature profile.

The aspects of the invention are also achieved by an ultra-fine aluminum powder characterized by from about 0.1 to about 4.5 wt. % oxide content with a specific surface area of from about 0.3 to about 5.0 $m^2/g$ which is hot worked at a temperature ranging from about 100° C. to about 525° C. depending on the recrystallization temperature of a particular aluminum alloy composition to refine grain size and homogenize the nano particle reinforcement phase of the metal matrix composite system.

BRIEF DESCRIPTION OF THE DRAWINGS

For a fuller understanding of the invention, the following detailed description of various embodiments should be read in conjunction with the drawings, wherein:

FIG. 7 is a graph of a typical particle size distribution of a HTA atomized aluminum powder;

DETAILED DESCRIPTION OF PREFERRED EMBODIMENTS

In carrying out the invention, the first step is selection of aluminum powder size. The present invention focuses on the particle size distribution (PSD) of the atomized aluminum powder which is not used for conventional powder metal technology. In fact the trend in aluminum P/M industry is to use coarser fractions of the PSD—typical in the d50 size of 50 .mu.m-400 μm range because of atomization productivity, recovery, lower cost, superior die fill or uniform pack density and the desire to have low oxide powder. Most commercial applications seek to reduce the oxide content especially in the press and sinter near-net-shape aluminum P/M parts for automotive and other high volume applications. Manufacturers of powder and end-users want the lower oxide aluminum powder since it is extremely difficult to perform liquid phase sintering and obtain a metallurgical particle to particle bond which is necessary to obtain theoretical densities and high mechanical properties with acceptable ductility values with oxide on the powder grain boundaries. The prior grain boundary oxide network results in low fracture toughness, low strength, and marginal ductility. Efforts have been made to reduce the alumina oxide but this oxide coating on the aluminum powder is extremely stable in all environments and is not soluble in any solvent. This fact leads the press and sinter near-net-shape industry and the high performance aerospace industry aluminum PM industry to purchase low oxide powder material.

In total contrast to the above noted industry criteria, the present invention employs superfine aluminum powder PSD (by industrial definition a PSD <30 μm) which results in alumina oxide content in the 0.1-4.5 w/o range, which is the oppose side of the spectrum.

Figure 1:
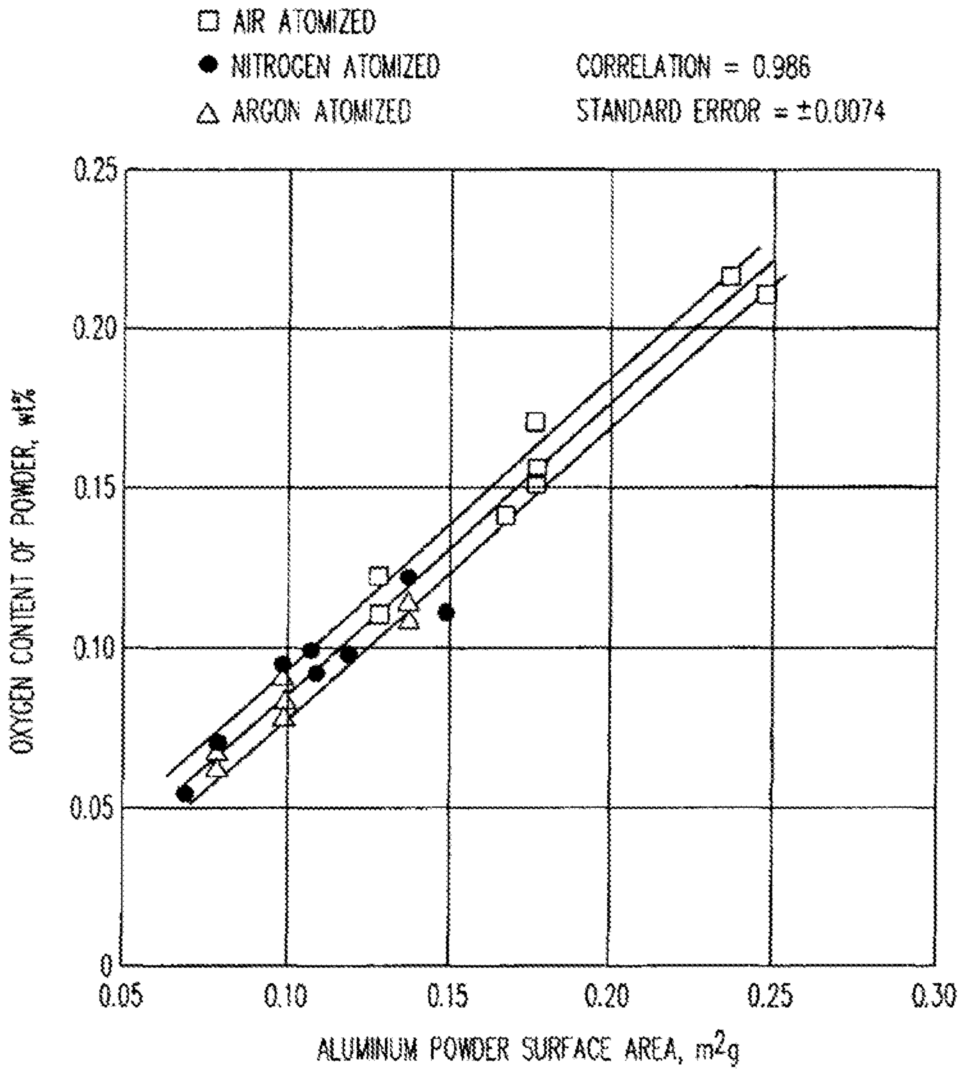
FIG. 1 (PRIOR ART)
FIG. 1 is a prior art graph of oxide thickness vs. type of atomization gas from "Metals Hand Book Ninth Edition Volume 7—Powder Metallurgy"
Figure 2A:
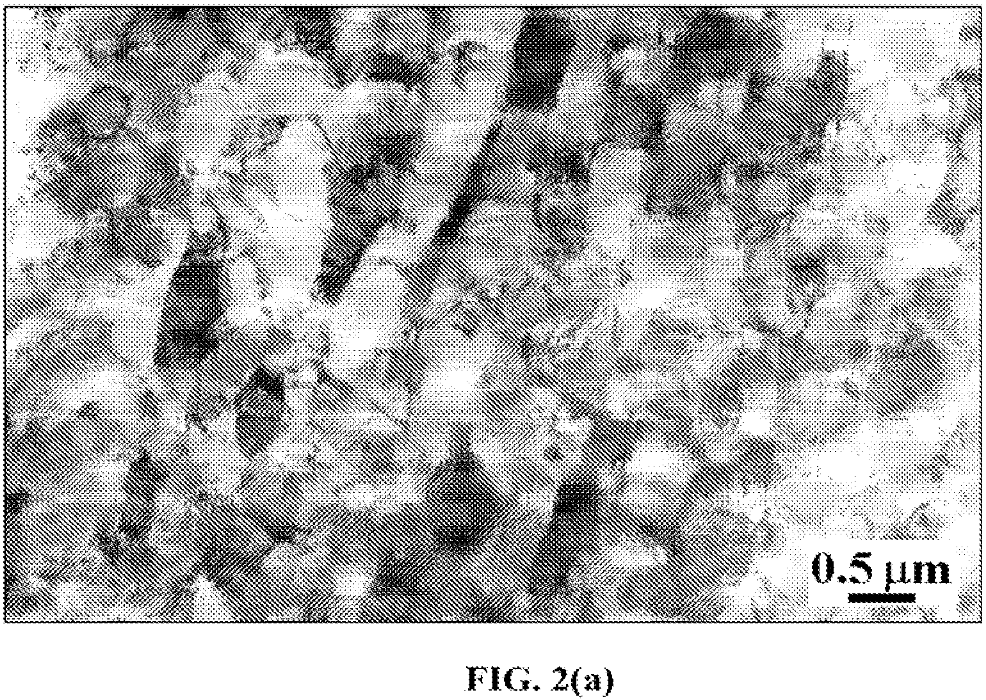
FIGS. 2(*a*), 2(*b*) and 2(*c*) are TEM photomicrographs relating to the effect of 1 μm, 10 μm and <400 μm powder size, respectively, on microstructure (extruded@350° C. billet temperature", R=11:1)
Figure 2B:
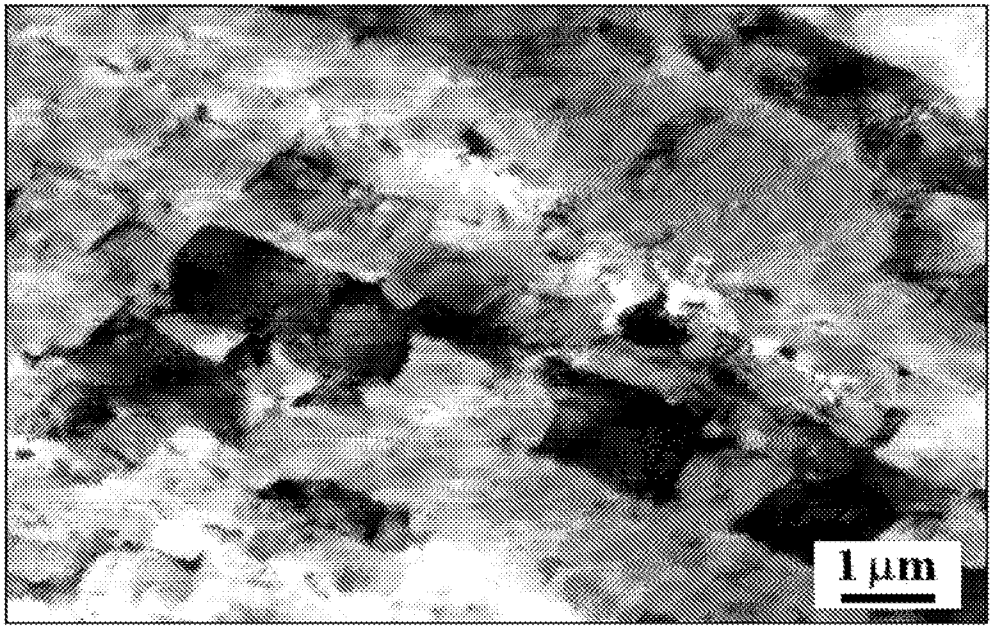
Figure 2C:
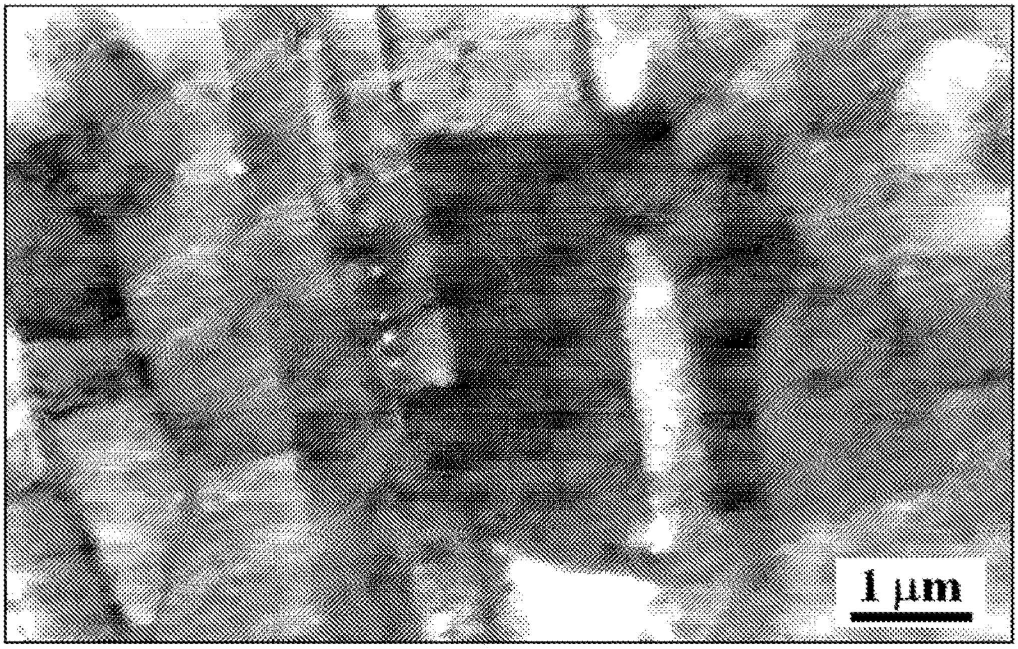
Figure 3:
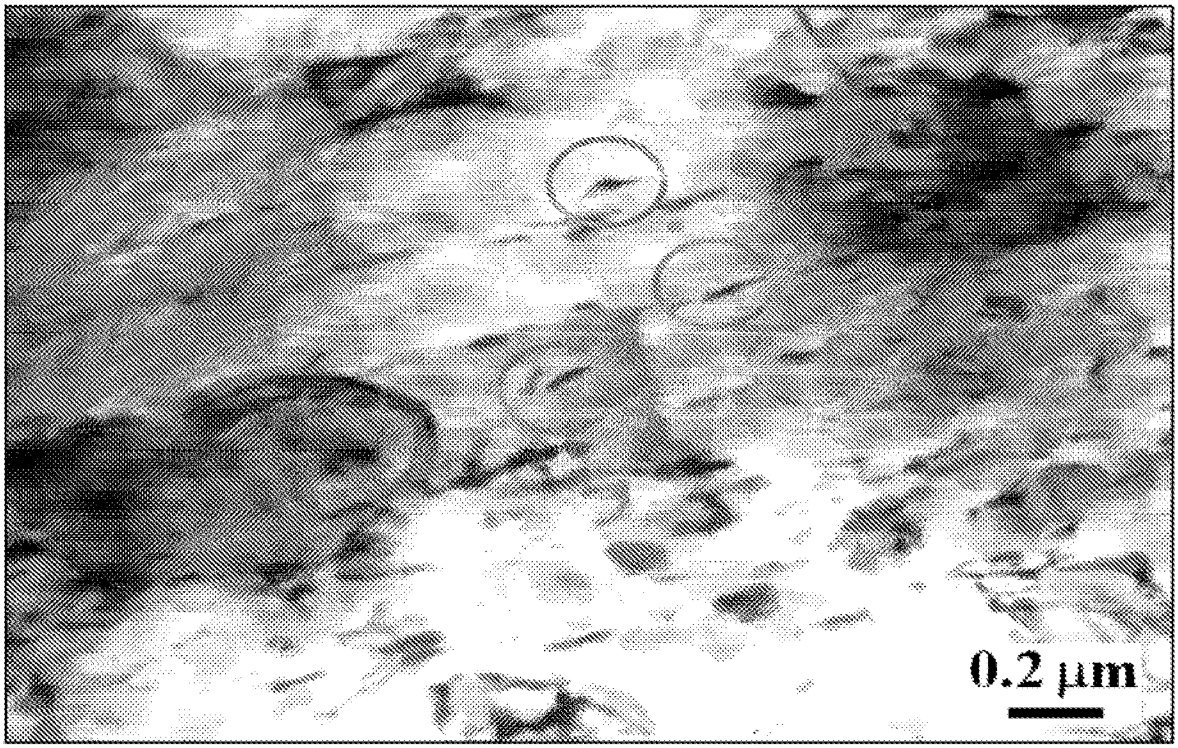
FIG. 3 is a TEM photomicrograph relating to the induced work effect to homogenize distribution of fine distorted oxides.

The invention includes taking the superfine powder and hot working the material below the recrystallization temperature of the alloy which further reduces the transverse grain size by a factor of 10 to a typical grain size of e.g. about 200 nm. The effect of the starting powder particle size is illustrated in FIG. 2 which shows the effect of 1 μm, 10 μm, and <400 μm aluminum powder extruded at 350° C. The hot work operation evenly distributes nanoscale alumina oxide particles (the former 3-7 nm oxide skin of the aluminum powder) uniformly throughout the microstructure as illustrated in FIG. 3 and circled in the micrograph. This ultra fine grain size and the nanoscale alumina particles combination results in a dual strengthening mechanism. The nanoscale alumina oxide particles pin the grain boundaries and inhibit grain growth to maintain the elevated mechanical property improvement of the composite matrix material. In certain embodiments, the oxide is redistributed into uniformly dispersed nano alumina particles intermixed with inter-metallic compounds. In certain embodiments, the inter-metallic compounds have a particle size of from about 2 to about 3 μm.

It has been found that increasing the alumina oxide content of one specific type of powder by 50% does not result in higher mechanical properties compared to the original powder. Increasing the oxide content by 100% or more may result in problems during consolidation process. During powder treatment to increase the alumina oxide content only the thickness of the oxide layer can be increased which results in bigger dispersoids in the matrix after hot working.

To increase the strengthening mechanism of grain boundary pinning, which is the designated positioning of nano-scaled dispersoids (alumina particles, the former oxide layer of the starting powder) along the grain boundaries of the microstructure, it is desirable to bring more fine particles into the structure. This can be realized by using a finer starting powder, or a powder with a higher specific surface area.

Figure 4:
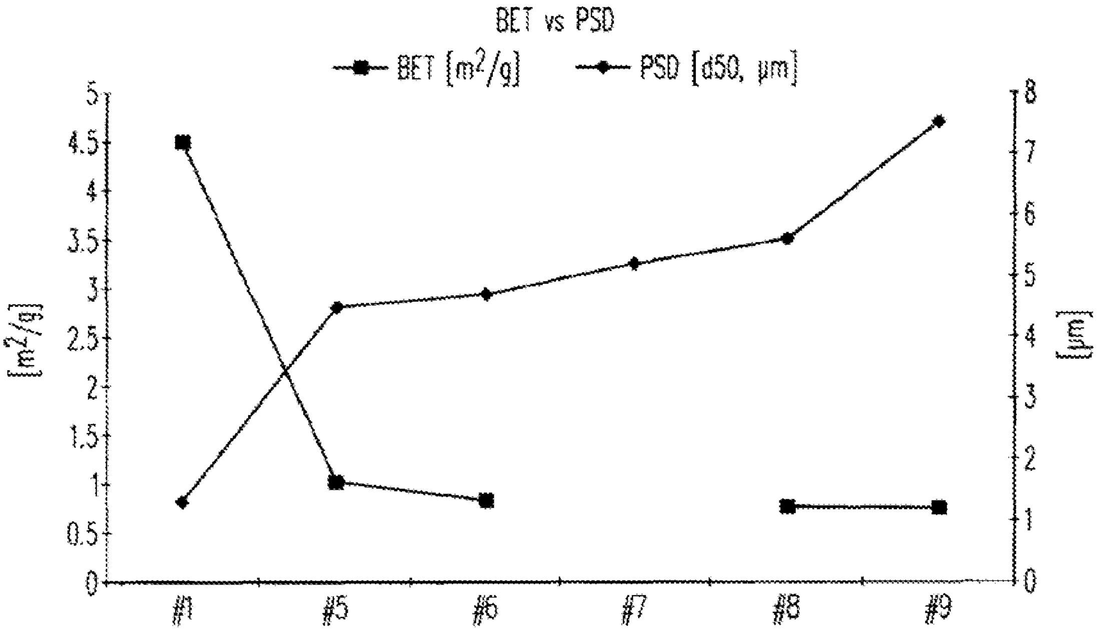
FIG. 4 is a graph of the bad correlation between d50 and specific surface area.
Figure 5:
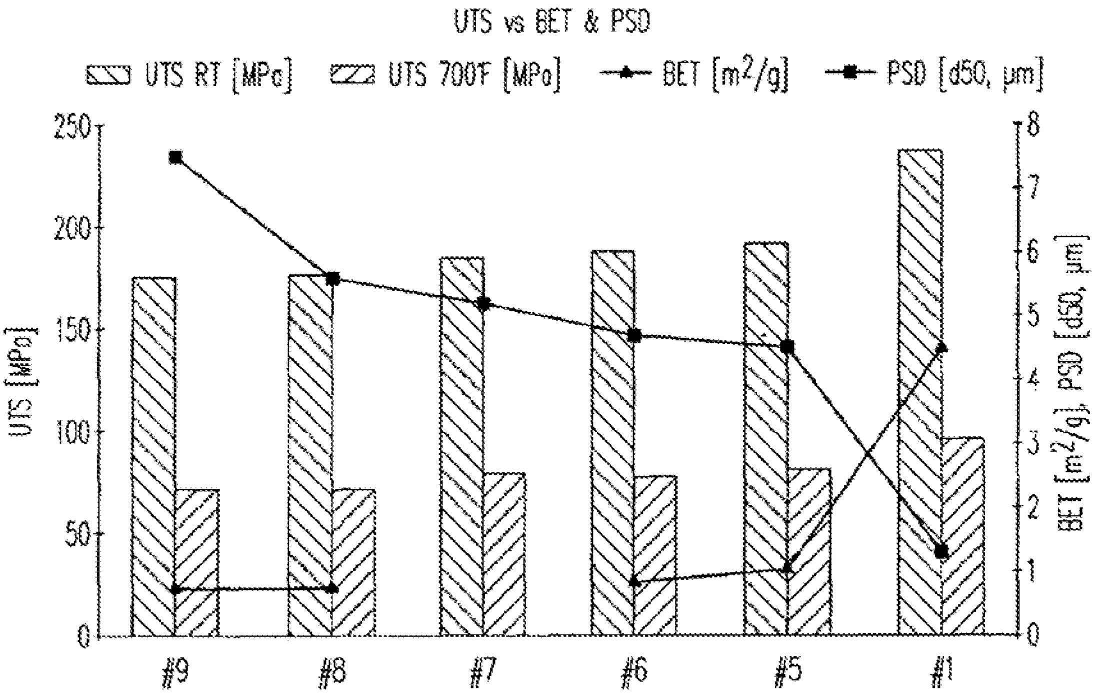
FIG. 5 is a graph of the correlation between mechanical properties and specific surface area.

By considering the particle size distribution together with the specific surface area of the starting powders, the mechanical properties of the hot worked material can be predicted. Powders with a higher specific surface will generally result in better mechanical properties compared to powders with a lower specific surface area. As can be seen in FIG. 4 powder sample #9 has roughly the same specific surface area as powder sample #5, although the PSD of sample #9 is much coarser than the PSD of sample #5. The mechanical properties correlate with the specific surface area, not with the PSD of the powders (FIG. 5). This figure shows UTS vs particle size distribution and specific surface area (test results of mechanical properties obtained on test specimen containing 9% of boron carbide particulate). Mechanical properties (UTS) correlate with BET not with the d50.

EXAMPLES

Figures 6A, 6B:
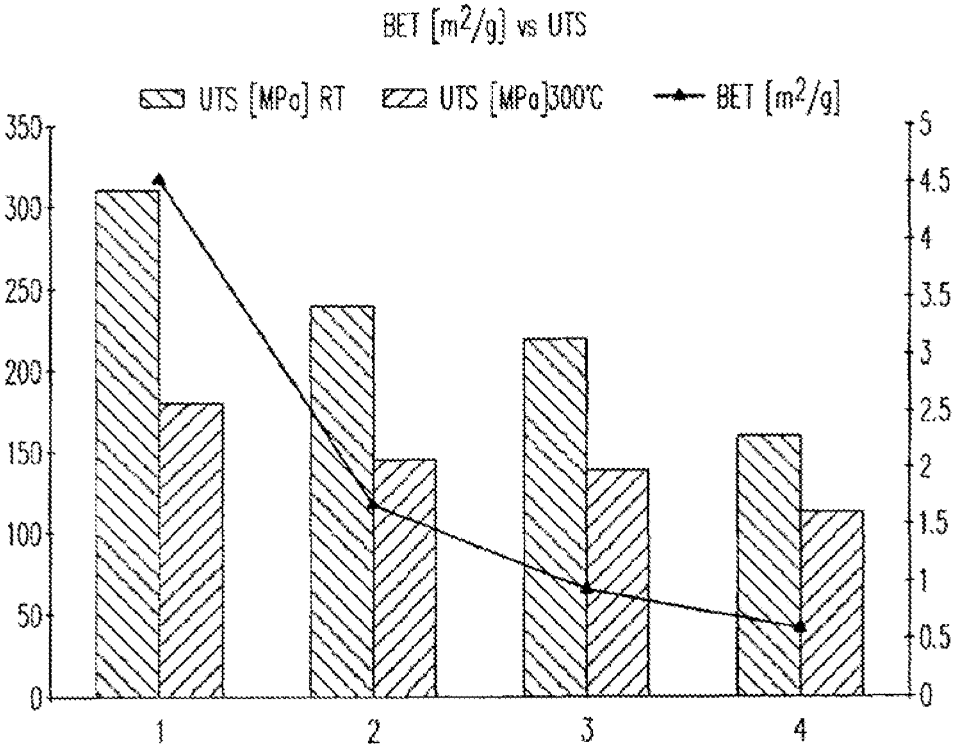
FIGS. 6(*a*) and 6(*b*) are a table and graph, respectively, of the correlation between mechanical properties and specific surface area.

Different powders with specific surface areas in the range between 0.3-5.0 $m^2/g$ were hot worked by extrusion at 400° C. into rods with a diameter of 6 mm which had been used for the production of tests specimen for tensile tests. The results are shown in the table and chart of FIGS. 6(*a*) and 6(*b*), respectively. This demonstrates that the finer the particle distribution (the higher the surface area) the better the mechanical properties. Powders were produced via gas atomization using confined nozzle systems and classified to required PSD via air classification. Afterwards, compacts were produced, by extrusion@400° C., R 11:1. High temperature tensile tests were made after 30 min. soak time@testing temperature.

Figure 8:
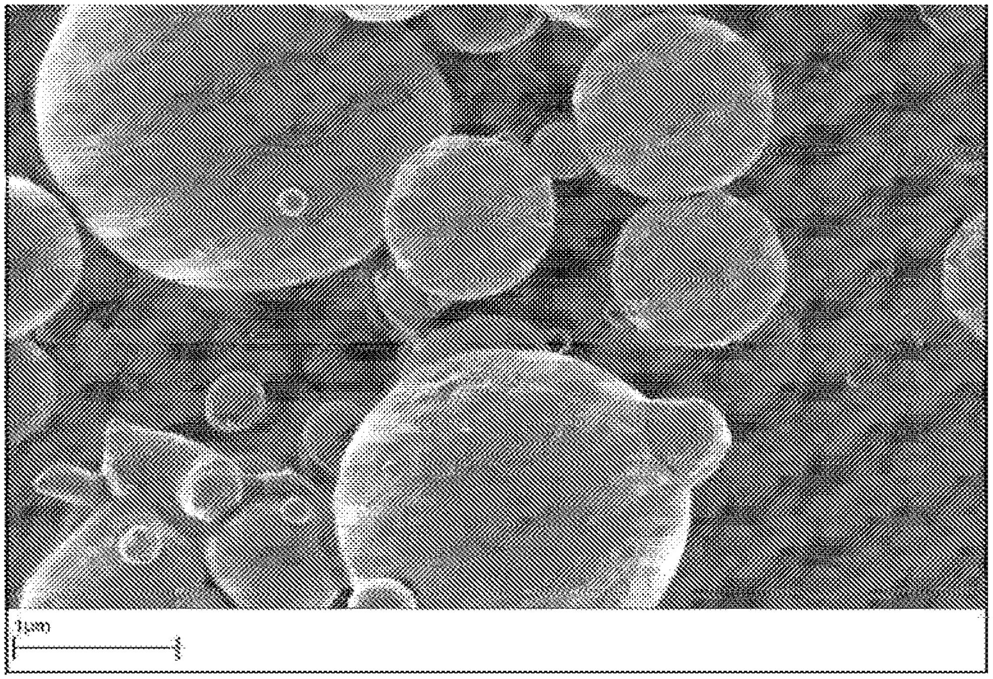
FIG. 8 is a SEM photograph of a HTA atomized aluminum powder.
Figure 9:
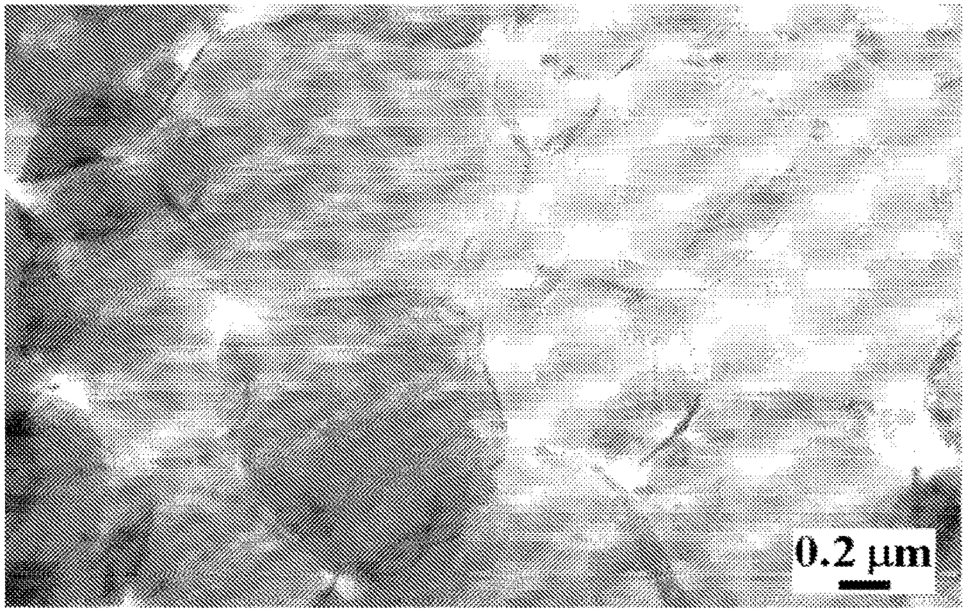
FIG. 9 is a TEM photograph of compacted (CIP) HTA atomized aluminum powder.

An example of the aluminum particle size used for the development is illustrated in FIG. 7. This graph illustrates PSD and as can be seen, the d50 is about 1.27 μm with d90 about 2.27 μm, which is extremely fine. Attached is a Scanning Electron Microscope (SEM) photograph (FIG. 8) "Picture of ultra fine atomized Al powder D50-1.2 μm" and Transmission Electron Micrograph (TEM). See FIG. 9, "Picture of ultra fine atomized Al powder D50-1.3 .mu.m" which illustrates the spherical shape of the powder. As shown therein, the hum marker (SEM) respectively the 0.2 μm marker (TEM) is a reference to verify the particle size of the powder. Since the aluminum powder in the particle size range is considered spherical it is easier to mathematically model and predict the oxide content. When modeling the oxide thickness and comparing the actual value of the oxide by dissolving the matrix alloy, there is good correlation that documents the targeted aluminum oxide content of the invention. Another characteristic of the powder is the very high surface area of the resulting PSD and the oxygen content as an indicator of the total oxide content of the starting raw material. The purchase specification to assure superior performance shall include the alloy chemistry, particle size distribution, surface area, and oxygen content requirements.

Figure 10:
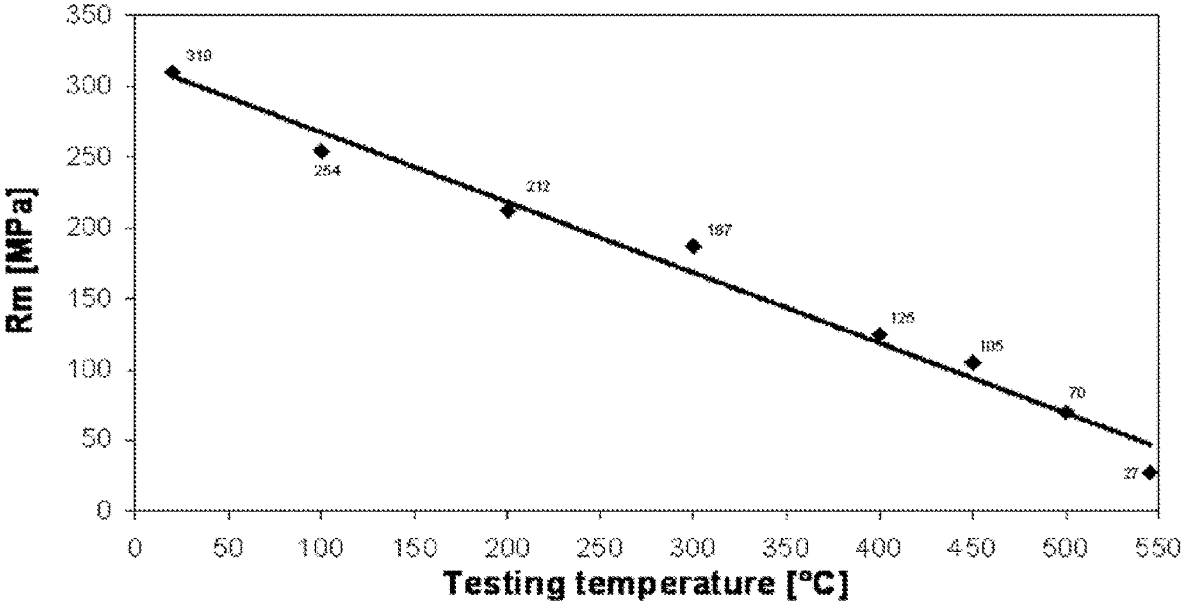
FIG. 10 is a graph of the linear property/temperature profile.

FIG. 10 illustrates the unique linear property/temperature profile of the high temperature nano composite aluminum alloy of the invention. The figure shows UTS (Rm) vs. temperature, 1.27 μm (d50) powder grade, consolidated via direct extrusion@350° C., R=11:1, 30 min. soak time at testing temperature before testing.

The typical processing route to manufacture the material for this invention is to fill the elastomeric bag with the preferred particle size aluminum powder, place the elastomeric top closure in the mold bag, evacuate the elastomeric mold assembly to remove a air and seal the air tube, cold isostatic press (CIP) using between 25-60,000 psi pressure, dwell for 45 seconds minimum time at pressure, and depressurize the CIP unit back to atmospheric pressure. The elastomeric mold assembly is then removed from the "green" consolidated billet. The billet can be vacuum sintered to remove both the free water and chemically bonded water/moisture which is associated with the oxide surfaces on the atomized aluminum powder. Care must be taken not to overheat the billet or approach the liquid phase sintering temperature in order to prevent grain growth and obtain optimum mechanical properties. The last operation is to hot work the billet to obtain full density, achieve particle to particle bond, and most importantly disperse the nano alumina particles uniformly throughout the microstructure.

Figure 11A:
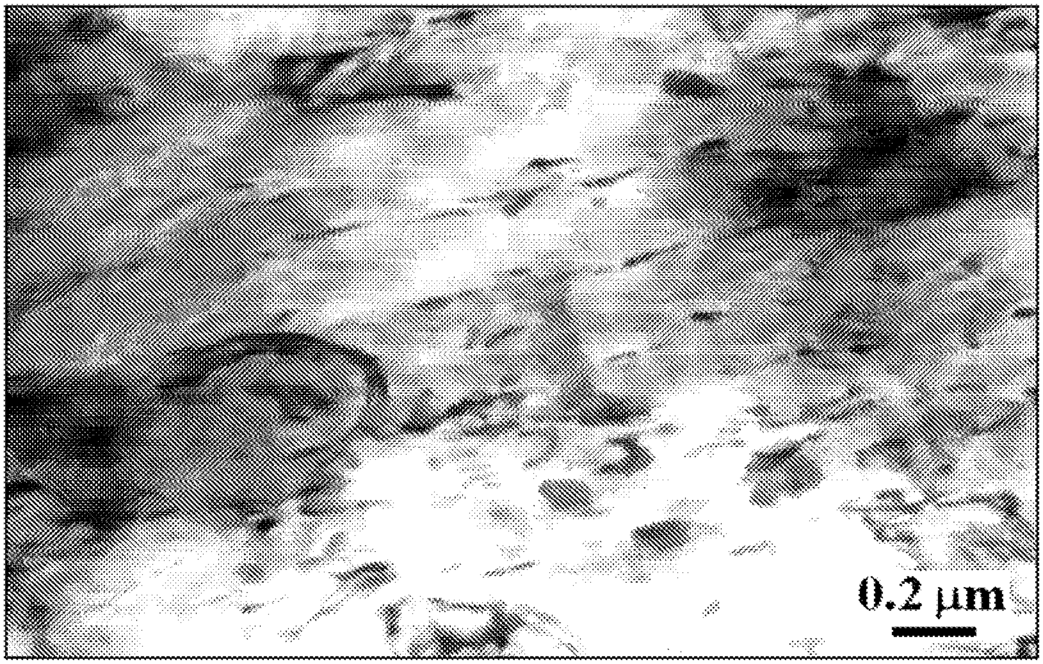
FIGS. 11(*a*) and 11(*b*) are TEM photomicrographs relating to the importance of the extrusion temperature.
Figure 11B:
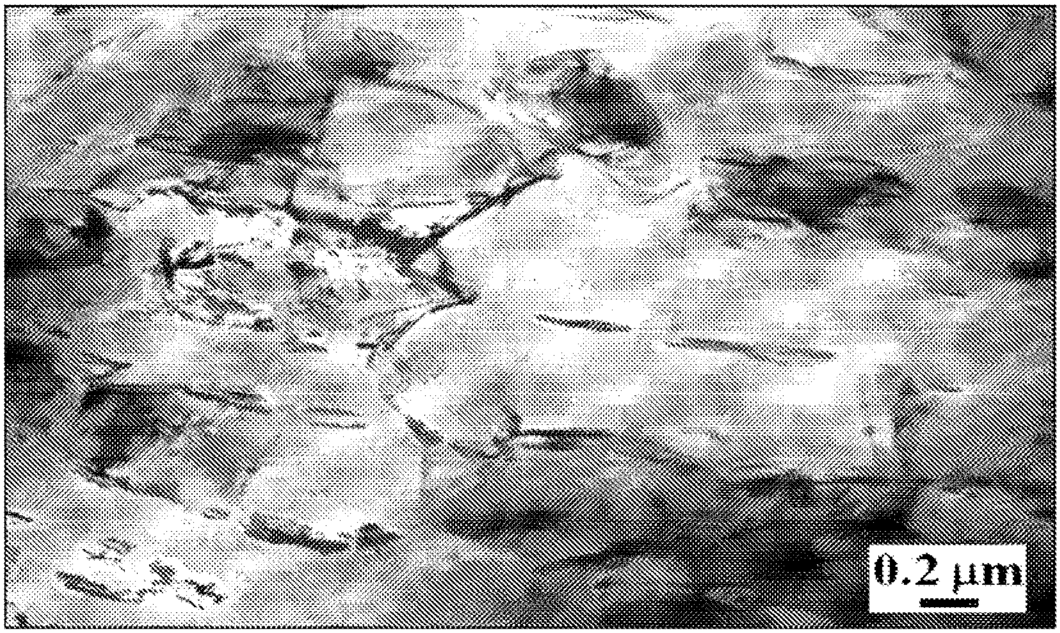

A preferred hot work method is to use conventional extrusion technology to obtain the full density, uniformly dispersed nano particle aluminum/alumina oxide composite microstructure. Direct forging or direct powder compact rolling technology could also be used as a method to remove the oxide from the powder and uniformly disperse the alumina oxide throughout the aluminum metal matrix. It is highly preferred to keep the extrusion temperature below the re-crystallization temperature of the alloy in order to obtain the optimum structure and optimum mechanical properties. FIGS. 11(*a*) and 11(*b*) are SEM photo micrographs which illustrate the importance of the extrusion temperature in order to increase the flow stress to mechanically work the material to obtain the desired microstructure. In photo micrograph FIG. 11(*a*) are visible the uniformly dispersed nano-alumina oxide particles in the newly formed grains. The nano particle alumina oxide particles are visible even inside the grain and at the grain boundaries which typically is done through the mechanical alloying process methods. The second photo micrograph FIG. 11(*b*) shows the larger grain size and the structure does not exhibit the same degree of work or the nano particles inside the grains.

To further demonstrate the significance of extrusion temperature in obtaining the desired microstructure for optimum mechanical properties, outlined below are typical mechanical properties of the nano aluminum/alumina composite material at various extrusion temperatures on tensile data at room temperature and 350° C. test temperatures.

| Room Temperature | Various Billet Extrusion Temperatures | | | |
|---|---|---|---|---|
| Mechanical Properties | 350° C. | 400° C. | 450° C. | 500° C. |
| UTS - Mpa/(KSI) | 310 (44.95) | 305 (44.25) | 290 (42.05) | 280 (40.60) |
| Yield - Mpa/(psi) | 247 (35.82) | 238 (34.51) | 227 (32.91) | 213 (30.88) |
| Elongation % | 9.0% | 10.0% | 10.0% | 10.9% |
| 1100 Aluminum/UTS | 124 (18.00) | N/A | N/A | N/A |

| 350° C. Test Temperature Mechanical | Various Billet Extrusion Temperatures | | | |
|---|---|---|---|---|
| Properties | 350° C. | 400° C. | 450° C. | 500° C. |
| UTS-Mpa/ (KSI) | 186 (26.97) | 160 (23.20) | 169 (24.50) | 160 (23.20) |
| Yield-Mpa/ (KSI) | 156 (22.62) | 145 (21.00) | 150 (21.75) | 150 (21.75) |
| Elongation | 10.7% | 10.4% | 9.5% | 10.0% |

These are excellent mechanical properties for a 4.5% nano alumina particle reinforced 1100 series superfine grained aluminum material compared with conventional ingot metallurgy 1100 series aluminum technology. Further, these results demonstrate the advantages of the superfine grained microstructure in combination with the small amount of nano particle aluminum/alumina materials compared to various conventional alloys and the concept of adding other ceramic particulate or rapid solidification of super saturated alloy elements in the aluminum matrix.

As mentioned above, one of aspects of this invention is to add a ceramic particulate to the nano aluminum/alumina composite matrix. One of the driving forces to the development of this new technology was the need for a high temperature matrix material to add boron carbide particle to expand the field of application of U.S. Pat. No. 5,965,829. It was a goal to develop a high temperature aluminum boron carbide metal matrix composition material suitable to receive structural credit from the US Nuclear Regulatory Commission for use as a basket design for dry storage of spent nuclear fuel applications. With elevated temperature mechanical properties of the aluminum boron carbide composite, designers can take advantage of the light weight/high thermal heat capacity of aluminum metal matrix composites compared to the industry standard stainless steel basket designs. In Europe, designers typically use boronated stainless steel but the areal density is low, the upper limit for the B10 isotope being 1.6% content, alloy density is high, and the thermal conductivity and thermal heat capacity is low compared to aluminum based composites. The aluminum-based composites of the present invention do not suffer from these shortcomings.

Another driving force behind the development of an aluminum boron carbide metal matrix higher temperature composite, in addition to the market need for such a material, was the experience with extruding up to 33 wt % boron carbide composite materials in a production environment, including the techniques described in U.S. Pat. No. 6,042,779 entitled "Extrusion Fabrication Process for Discontinuous Carbide Particulate Metal Matrix Composites and Super Hypereutectic Al/Si Alloys," issued on Mar. 28, 2000 (the '779 patent) and which is hereby incorporated by reference in its entirety. This extrusion technology could allow designers the freedom of design to extrude to net-shape a variety of hollow tube profiles in order to maximize packing density, add flux traps, and lower manufacturing cost.

A particular use for the addition of ceramic particulate to the nano particle aluminum/alumina high temperature matrix alloy is the addition of nuclear grade boron carbide particulate. All of the tramp elements for the alloy matrix material such as Fe, Zn, Co, Ni, Cr, etc. are held to the same tight restrictions and the boron carbide particulate is readily available in accordance to ASTM C750 as outlined in the above described U.S. Pat. No. 5,965,829. The boron carbide particulate particle size distribution is similar to that outlined in the '829 patent. An exception to the teaching of the '829 patent is the use of high purity aluminum powder with the new particle size distribution as described above.

The typical manufacturing route for the composite of the invention is first blending the aluminum powder and boron carbide particulate materials, followed by consolidation into billets using CIP plus vacuum sinter technology as outlined in the above referenced patent. In a preferred embodiment, the extrusion is carried out in accordance with the teaching of U.S. Pat. No. 6,042,779 (the '779 patent), which is hereby incorporated by reference in its entirety. Since this is an elevated temperature aluminum metal matrix composite material it was found necessary to change the temperature of the extrusion die, container temperature, and billet temperature in order to maintain the desired properties. In general it is desirable that the die face pressure be increased by about 25% over previously employed standard metal matrix composite materials. In order to overcome the higher flow stress of the nano particle aluminum/alumina composite matrix alloy, the extrusion press must be sized about 25% larger in order to extrude the material. Extrusion die technology is capable of these higher extrusion pressures without experiencing failure of collapse of the extrusion die.

An example of the new high temperature nano particle aluminum/alumina plus boron carbide at a 9% boron carbide reinforcement level and the resulting typical mechanical properties and physical properties are outlined below.

| Property Description | 25° C. (70° F.) | 100° C. (212° F.) | 200° C. (392° F.) | 300° C. (572° F.) | 350° C. (662° F.) |
|---|---|---|---|---|---|
| UTS- MPa/KSI | 238/34.5 | 208/30.2 | 166/24.4 | 126/18.3 | 116/16 |
| Yield - Mpa/KSI | 194/28.1 | 164/23.8 | 150.21.7 | 126/18.2 | 105/15 |
| Elongation % | 11% | 10% | 9.0% | 8.0% | 8.0% |
| Modulus of Elasticity MPa/MPSI | 83/12.2 | 81/11.9 | 73/10.7 | 63/9.2 | 55/7.9 |
| Thermal Conductivity (W/m-K) | | 184 | 185 | 184 | 183 |
| Thermal Conductivity (BTU/ft-hr-° F.) | | 106 | 107 | 106 | 107 |
| Specific Heat J/g-° C. | | 0.993 | 1.053 | 1.099 | 1.121 |
| Specific Heat (BTU/lb-° F.) | | 0.237 | 0.252 | 0.269 | 0.280 |

Notes:
Tensile coupons were machined and tested in accordance in ASTM E8 &ASTM E 21
Thermal conductivity tested in accordance to ASTM E 1225
Specific heat tested in accordance to ASTM E 1461

The invention claimed is:

1. A process for manufacturing a nano aluminum/alumina metal matrix composite, comprising the steps of:

a) providing a powder blend of an aluminum powder and boron carbide, the aluminum powder having a natural oxide formation layer and an aluminum oxide content between 0.1 and 4.5 wt. % and a specific surface area of between 0.3 $m^2/g$ and 5.0 $m^2/g$;

b) hot working the powder blend, and forming thereby a superfine grained matrix aluminum alloy; and c) simultaneously forming in situ a uniform distribution of nano particles of alumina throughout said alloy by redistributing said aluminum oxide; wherein said alloy has a linear property versus temperature profile; and wherein the aluminum powder has a particle size of less than 30 μm.

2. The process as claimed in claim 1, wherein said superfine matrix aluminum alloy has a transversal grain size of 200 nm.

3. The process as claimed in claim 1, wherein the step of hot working is carried out at a temperature less than the melting point of said alloy.

4. The process as claimed in claim 1, wherein the aluminum powder is atomized with a natural occurring oxide layer thickness of between 3-7 nm regardless of the type of atomization gas and alloy type during the powder atomization manufacturing process.

5. The process as claimed in claim 1, wherein the process utilizes atomized aluminum powder with a particle size distribution (PSD) of 100% powder less than 30 μm and a d50 between 1 and 20 μm regardless of the atomization gas or alloy composition used in forming said powder.

6. The process as claimed in claim 1, wherein said process is free of mechanical alloying.

* * * * *